Figure 3:
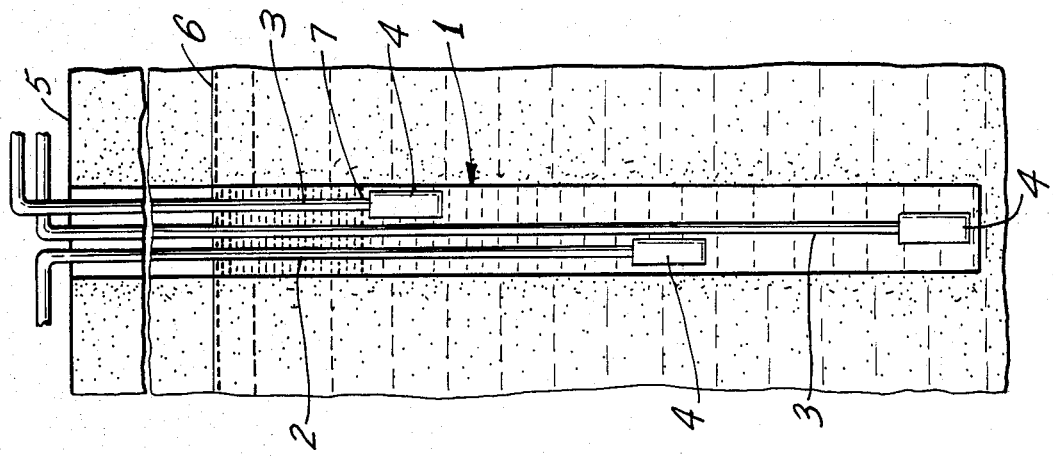

United States Patent [19]

Reijonen

[11] Patent Number: 4,495,991
[45] Date of Patent: Jan. 29, 1985

[54] PROCEDURE FOR DRAWING WATER FROM A GROUND WATER STORE

[76] Inventor: Veli Reijonen, Takametsäntie 11, 00620 Helsinki 62, Finland

[21] Appl. No.: 396,318

[22] Filed: Jul. 8, 1982

[30] Foreign Application Priority Data

Jul. 15, 1981 [FI] Finland .................................. 812220

[51] Int. Cl.$^3$ .............................................. E21B 47/04
[52] U.S. Cl. .................................. 166/250; 166/54.1; 166/105
[58] Field of Search ................. 166/250, 369, 53, 54.1, 166/313, 105; 210/540, 538; 417/122, 109

[56] References Cited

U.S. PATENT DOCUMENTS 3,202,215  8/1965  Stanonis .............................. 166/248
3,901,811  8/1975  Finch .................................. 166/105

FOREIGN PATENT DOCUMENTS 29322    7/1907  Austria ............................... 166/369
1258355  3/1960  France ............................... 166/250

Primary Examiner—Stephen J. Novosad
Assistant Examiner—Mark J. DelSignore
Attorney, Agent, or Firm—Toren, McGeady and Stanger

[57] ABSTRACT

The invention concerns a procedure for drawing water from a ground water store in such manner that the water obtained will contain the least possible amount of iron or manganese compounds, of hardness-inducing salts or of other detrimental impurities occurring in the ground water. The procedure is intended for use in those cases commonly encountered in practice where there is stratification in the occurrence of impurities in the ground water, and according to it at least two separate lifting pipes are inserted in the soil in different layers in accordance with the way in which the contents of impurities vary in different layers. From the lifting pipes water of different quality is then obtained, and the invention implies that water is simultaneously drawn with both lifting pipes, but only the water from that lifting pipe is conducted to normal consumption which is of better quality. The significance of the lifting of inferior quality water lies therein that thereby is reduced the water mixing between different layers, whereby the quality of the water conducted to consumption is constantly good.

4 Claims, 3 Drawing Figures

U.S. Patent   Jan. 29, 1985   4,495,991

PROCEDURE FOR DRAWING WATER FROM A GROUND WATER STORE

The object of the present invention is a procedure for drawing water from a ground water store, wherein in the soil are inserted at least two separate lifting pipes by which water is drawn from different layers with regard to ground water quality.

Drawing of water from a deep ground water store for instance through a drilled well is usually accomplished using fixedly installed lifting pipes provided with pumps. With a view to increasing the capacity of the well, several lifting pipes may be installed in one well, and it has then been customary to carry one of the pipes close to the bottom of the well, whereby it is possible to ensure the water supply even on occasions when for one reason or another the water level in the well falls exceptionally far down.

A problem which is common in the drawing and use of ground water is posed by the iron and manganese compounds which are present in solution in the water. If these compounds are not removed from the water, they will precipitate in the water supply system and in the course of time result in plugging of the pipelines. One solution by which to avoid this problem has been disclosed in the Finnish publicizing print No. 43852, which teaches to encircle the well with pipes through which oxygen-loaded feed water is conducted into the ground. The solution aims at oxidizing the iron and manganese ions into insoluble form, whereby they remain as a precipitate in the soil and pure water only enters the well. In actual practice this procedure has worked excellently in many instances, that is, the desired long-term purifying effect has been achieved with a minimal quantity of feed water introduced in the soil, but on the other hand there also are many installations where it has been necessary to conduct feed water into the soil over a prolonged period and in large quantities before the iron and manganese contents of the water in the well have begun to go down. In such instances the use of the procedure becomes unprofitable if the desired result can be reached with its aid at all.

In coastal regions in particular, the ground waters moreover contain as impurity, hardness-inducing calcium and magnesium salts. No method is known to remove the hardness of water already in the soil by an approach similar to that outlined above.

It has now been found that strong stratification is often present in the occurrence in ground water both of iron and manganese and of hardness-inducing salts. This implies that the content of said impurities is high in the ground water at a certain depth in the soil, while the ground water above or below has substantially higher purity and may indeed be virtually quite pure. It is common that these impurities are concentrated in the topmost ground water course closest to the ground level. This operation explains the problems encountered in applications of the procedure taught by the publicizing print No. 43852 by making it clear that the oxygen-carrying feed water has simply been carried too far down in the soil. Moreover, the observation furnishes an explanation for the phenomenon frequently noted that the iron content in the well gradually increases in the course of use. What happens is that when from great depth in the well pure, iron-free water is drawn, water with abundant iron content from the topmost ground water course flows to replace it, and in the course of continued water drawing this type of water gradually spreads to ever greater depth in the well and, in due time, will reach the depth where the end of the lifting pipe is located.

The object of the present invention is to devise a simple procedure based on the observation reported and by which from a ground water store is obtained pure water for consumption in such a way that the water quality will be unchanged even during prolonged pumping. The invention is characterized in that the locations of the lifting pipes are selected in accordance with the different contents, prevailing in different layers, of the iron or manganese compounds, hardness-inducing salts or other harmful substances contained in the ground water in such manner that from the pipes is obtained water of different qualities, and that only the water which is of better quality is conducted to normal consumption.

It is possible in the procedure of the invention to control the water quantities drawn from different depths in such manner that hardly any mixing takes place between different courses in the water. Such control may be based on measuring the content of the detrimental impurities in the water drawn from the well, and unchanged contents are then an indication to the effect that the proportion of the water quantities drawn by the different pipes is correct.

It is an advantage of the invention e.g. over the procedure disclosed in the publicizing print No. 43852 that no specific feeding pipes placed around the well are needed. For practicing the procedure it is enough to have a conventional ground water well that has been provided with two or several lifting pipes extending to different depths. The water of poorer quality obtained from the well may be discarded or used to a purpose where the impurity present in the water causes no detriment. It is only essential that this water is not mixed with the higher quality water obtained from the well and which latter can usually be conducted into the water supply system as it is.

Figure 2:
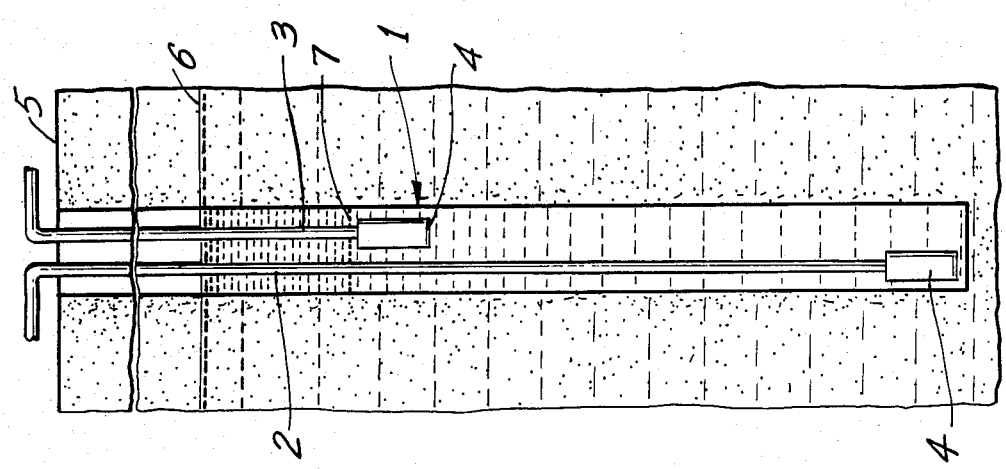
Figure 1:
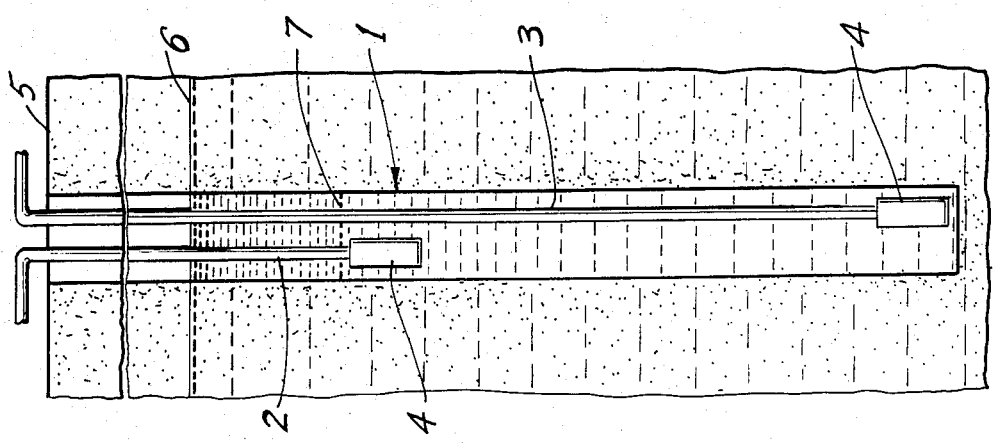

The invention is more closely described in the following with the aid of examples, with reference being made to the attached drawing, wherein:

FIG. 1 displays a drilled well where the water going to consumption is drawn from the bottom of the well, FIG. 2 displays a drilled well where the water going to consumption is drawn from the top part of the well, and FIG. 3 displays a drilled well where water going to consumption is drawn both from the bottom of the well and from its top part.

In FIG. 1 has been depicted a drilled well 1 extending to great depth in a soil layer carrying ground water and fitted with two separate water lifting pipes 2 and 3. Each lifting pipe has been provided with a submerged pump 4 mounted on the end of the pipe. Moreover, in the figure reference numeral 5 indicates the ground surface, 6 indicates the surface level of the ground water in the soil and 7 indicates the top margin of the well's sieve portion.

Iron and manganese compounds and hardness-inducing salts occur commonly as impurities in ground waters, and moreover they are frequently concentrated only in a certain stratum in the soil carrying ground water. In the case depicted in FIG. 1, the impure water is concentrated close to the surface 6 of the ground water, and this is the case most often encountered in practice. By the lifting pipe 2, which has its end close to the top margin 7 of the well's sieve portion, impure water is obtained in this case, whereas by the lifting pipe 3, of which the end is located close to the bottom of the well, pure water is obtained. The lifting pipes 2 and 3 are used so that water is drawn from the well simultaneously with both pipes, but only the pure water obtained from pipe 3 is conducted into the water supply system.

The impure water obtained by the pipe 2 is either discarded or used to a purpose where no detriment arises from the impurity of the water, e.g. for irrigating plantations. The significance of lifting the impure water is in the fact that by its aid it is possible to reduce substantially the mixing, caused by the drawing of water, of the water in the depth direction of the well, which otherwise would result in increasing concentration of impurities at the end of the pipe drawing the water that goes to consumption. The simultaneous use of both lifting pipes 2 and 3 does not necessarily imply that the pipes should work "in step"—it is merely essential that within a given, relatively short period of time water is drawn with both tubes so that the water cannot get mixed to any significant extent in the depth direction of the well.

In the case of FIG. 2, the amount of impurities carried in the water is maximum on the bottom of the well, and therefore the end of the pipe 2 lifting water of poorer quality has been carried to the bottom of the well and the end of the pipe 3 lifting water that goes to consumption has been placed in the upper part of the well.

In FIG. 3 the amount of impurities is at its highest around the center of the well in the vertical direction. The end of the pipe 2 lifting impure water is thus placed about at the center of the well, and the lifting of water for consumption is carried out by means of two pipes 3, one of them having its end at the bottom of the well and the other having its end in the upper part of the well above the end of pipe 2.

The procedure of the invention has been tried out in a well from which water had been drawn at 1200 liters/min. using one single lifting pipe, the end of which was located at the half-way point of the well's sieve-provided part. The water drawn had then presented iron content 1.0–1.5 mg/l and manganese content 0.20–0.25 mg/l. After it was found that the iron and manganese loadings were highest in the upper part of the well close to the water surface, two separate lifting pipes were installed in the well, one having the end in the upper part of the well and the other on its bottom. These two tubes were subsequently used simultaneously, by the first-mentioned tube water being drawn from the upper part of the well at 300 liters/min. and by the latter from the bottom of the well at 1200 liters/min. In the water from the first-mentioned pipe, measurements revealed the iron content to be 2.4 mg/l and the manganese content 0.6 mg/l, while the water from the latter pipe contained iron and manganese 0.02 and 0.03 mg/l, respectively. It is thus understood that the iron and manganese loadings of the water drawn from the well could be brought down to a fraction of the earlier readings despite the fact that the capacity of the well was left unchanged.

The second experiment took place in a well from which water had been drawn at 600 liters/min. and where the iron content of the water had been 2.1 mg/l. In this case the iron content was found to be highest on the bottom of the well, and therefore two lifting pipes were installed, the end of one being placed on the bottom of the well and that of the other close to the surface of the well. By the first-mentioned pipe subsequently water was drawn at 200 liters/min. from the bottom of the well and by the latter at 600 l/min from the surface of the well. The iron content was measured to be 6.8 mg/l in the water lifted by the first-mentioned pipe and 0.01 mg/l in that from the latter.

It is obvious to a person skilled in the art that different embodiments of the invention are not confined to the examples presented and may instead vary within the scope of the claims following below. For instance, the water lifting pipes 2 and 3 must not necessarily both be located in the same well: they may be located in separate wells which lie close to each other. Moreover, the number of wells and water lifting pipes may be more than two, depending on circumstances. It is possible to lift pure water from one well and impure water from the other wells, or vice versa.

The boundary surface between pure water and impure water is not always horizontal in a ground water store: it may be quite steeply inclined. When in such a situation two wells are constructed side by side, the outcome may be that pure water and impure water will be drawn from the same height but from different layers as regards the ground water quality.

I claim:

1. Procedure for drawing water from a ground water store wherein the ground water store has a considerable vertical height containing water layers of different quality relative to the water quality suitable for consumption with a first layer having an impurity content so that the water is suitable for consumption and a second layer having a higher impurities content which renders the water less suitable for consumption, determining the location of the first and second layers, installing at least two separate lifting pipes into the ground water store so that the inlet to each lifting pipe is located in a different one of the first and second layers, selectively drawing water during a given relatively short period of time from each of the lifting pipes extending into the first and second layers so that water is drawn from the first and second layers during the given period of time, drawing a sufficient quantity of the water from the second layer during the given relatively short period of time to limit movement of water from the second layer to the first layer for preventing the mixture of the water in the second layer with the water in the first layer for maintaining the quality of the water in the first layer, and supplying the water only from the first layer for use in normal consumption.

2. Procedure according to claim 1, characterized in that at least in the water conducted for normal consumption the impurities content is monitored by one of continuous and regularly repeated measurements.

3. Procedure according to claim 1, characterized by drawing the water from the second layer at a location below the water contained in the first layer.

4. Procedure according to claim 1, characterized by drawing the water from the second layer at a level located above the level of the first layer.

* * * * *